Sept. 8, 1925.  B. SILVERMAN  1,552,963
COMB
Filed July 23, 1924
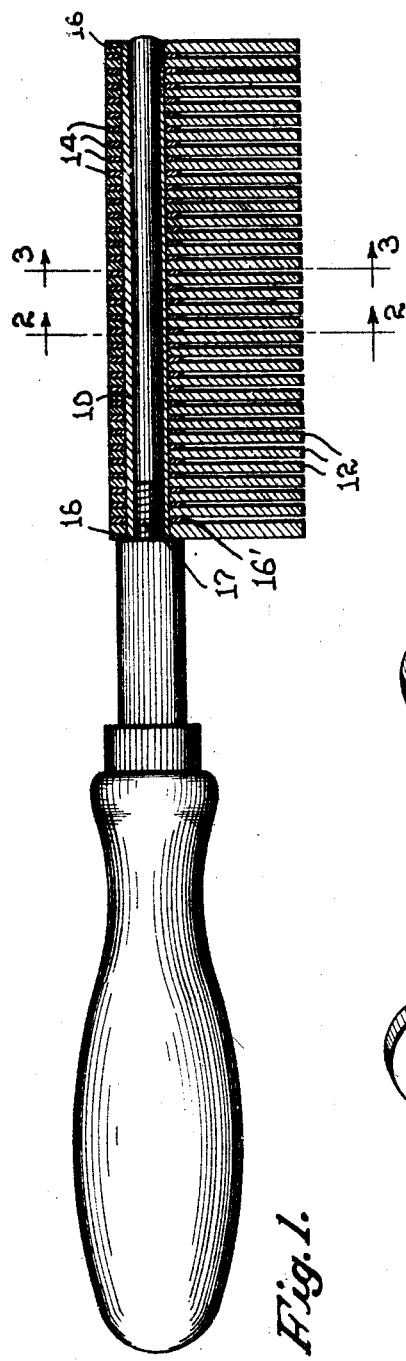
Fig. 1.
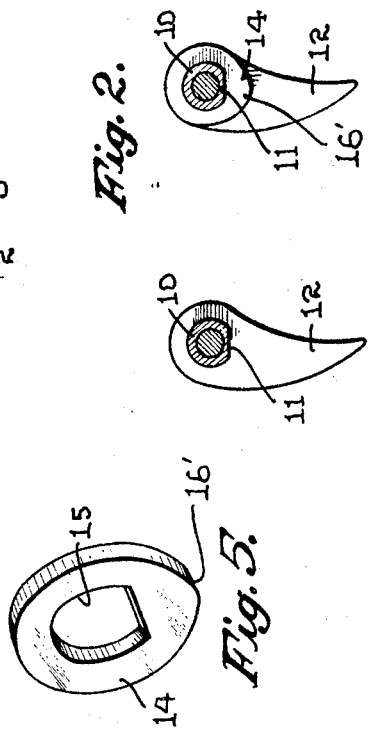
Fig. 2.
Fig. 3.
Fig. 5.
Fig. 6.
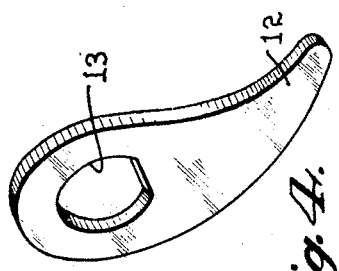
Fig. 4.
Inventor
B. Silverman
By
Scott Snyder
Attorney Patented Sept. 8, 1925.

1,552,963

UNITED STATES PATENT OFFICE.

BENJAMIN SILVERMAN, OF CHATTANOOGA, TENNESSEE, ASSIGNOR OF ONE-HALF TO J. RUSSEL EARP, OF CHATTANOOGA, TENNESSEE.

COMB.

Application filed July 23, 1924. Serial No. 727,643.

*To all whom it may concern:*

Be it known that BENJAMIN SILVERMAN, a citizen of the United States, residing at Chattanooga, in the county of Hamilton and State of Tennessee, has invented certain new and useful Improvements in Combs, of which the following is a specification.

This invention relates to hair combs of the general type illustrated in my copending applications of which my application filed the 23rd day of July 1924, and bearing the Serial Number 727,644 is a type.

The present invention relates more especially to the manner of assembling the teeth of a comb of this description and its principal object is to provide an improved construction for this purpose wherein novel means are provided for the holding of the comb teeth in proper alinement and for holding these teeth also properly spaced.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a vertical longitudinal section through a comb constructed in accordance with this invention and showing the tooth assembly.

Figure 2 is a section on the line 2—2 of Figure 1.

Figure 3 is a section on the line 3—3 of Figure 1.

Figure 4 is a detail perspective of one of the teeth.

Figure 5 is a detail perspective of one of the spacers.

Figure 6 is a detail perspective showing a portion of the hollow rod on which the teeth and spacers are assembled.

In the construction of the invention as herein illustrated there is provided a hollow rod 10 having one side flattened as at 11. On this rod are assembled the teeth 12 each of which is provided at its base end with an aperture 13 having an upper circular periphery and a lower rectangular periphery. The aperture thus corresponds in shape and size to the exterior of the rod 10. Alternating with the teeth are spacer members 14 each of which has an aperture 15 corresponding in size and shape to the apertures 13. The teeth and spacers are assembled alternately on the rod and, if desired, may be united by welding but preferably are held in position by riveting over the ends of the hollow rod as shown in Figure 1 at 16, the end teeth 12 being thickened and having the openings 13 countersunk so that the riveting is flush. Screwed into the hollow rod is the usual handle member 17, the construction of this handle member and the means of attaching the same forming the subject matter of a separate application executed of even date herewith and bearing the Serial Number 727,644.

It will be observed that the spacers 14 are each somewhat oval form and that the aperture 15 is at the larger end of the oval while the small end is sub-acutely pointed as at 16'. This pointed construction is found to aid in straightening the hair.

There has thus been provided a simple and efficient device of the kind described and for the purpose specified.

Having thus described the invention, what is claimed as new, is:

In a comb of the class described, a supporting member consisting of a cylindrical tube having one side flattened on the exterior, comb teeth each having a non-circular aperture in its base corresponding in size and shape to the cross section of the tube, said teeth being positioned upon the tube in spaced relation, spacer members each having a non-circular aperture corresponding in size and shape to the cross section of the tube, said spacer members being arranged alternately with the comb teeth on said tube, the end teeth being provided with rivet head receiving countersinks around the apertures therein, the ends of the tube being riveted over to fill said countersinks and bind the teeth and spacers tightly together on said tube.

In testimony whereof I affix my signature.

BENJAMIN SILVERMAN.